United States Patent
Jain

(10) Patent No.: US 7,356,663 B2
(45) Date of Patent: Apr. 8, 2008

(54) LAYERED MEMORY ARCHITECTURE FOR DETERMINISTIC FINITE AUTOMATON BASED STRING MATCHING USEFUL IN NETWORK INTRUSION DETECTION AND PREVENTION SYSTEMS AND APPARATUSES

(75) Inventor: Hemant Kumar Jain, Los Gatos, CA (US)

(73) Assignee: IntruGuard Devices, Inc., Sunnyvale, CA (US)

( * ) Notice: Subject to any disclaimer, the term of this patent is extended or adjusted under 35 U.S.C. 154(b) by 377 days.

(21) Appl. No.: 10/984,244

(22) Filed: Nov. 8, 2004

(65) Prior Publication Data

US 2006/0101195 A1    May 11, 2006

(51) Int. Cl.
  *G06F 13/00* (2006.01)
(52) U.S. Cl. .................. 711/173; 711/122
(58) Field of Classification Search .......... 711/173
  See application file for complete search history.

(56) References Cited

U.S. PATENT DOCUMENTS

| | | | | |
|---|---|---|---|---|
| 2003/0051043 | A1 | 3/2003 | Wyschogrod et al. | 709/230 |
| 2003/0065800 | A1 | 4/2003 | Wyschogrod et al. | 709/230 |
| 2003/0110208 | A1 | 6/2003 | Wyschogrod et al. | 709/202 |
| 2003/0163803 | A1 | 8/2003 | Wyschogrod et al. | 717/141 |
| 2003/0221013 | A1* | 11/2003 | Lockwood et al. | 709/231 |
| 2004/0049596 | A1 | 3/2004 | Schuehler et al. | 709/238 |
| 2004/0059443 | A1 | 3/2004 | Sharangpani | 700/48 |
| 2004/0162826 | A1 | 8/2004 | Wyschogrod et al. | 707/6 |

OTHER PUBLICATIONS

Aho, Alfred V. and Corasick, Margaret J., "Efficient String Matching: An Aid to Bibliographic Search", 1975, Communications of the ACM, vol. 18, Issue 6, pp. 333-340.*
Sidhu, R. and Prasanna, V.K. "Fast Regular Expression Matching using FPGAs", 2001, IEEE Symposium of Field-Programmalbe Custom Computing Machines (FCCM).*
Sidhu, R. et al., "Sring Matching on Multicontext FPGAs using Self-Reconfiguration", 1999, ACM/SIGDA 7 Intl. Symposium on Field Programmable Gate Arrays, pp. 217-226.*
Virtex-E Datasheet, "Virtex(TM)-E 1.8 V Field Programmable Gate Arrays", Jul. 17, 2002, DS022-1 (v2.3), 6 pages.*

(Continued)

*Primary Examiner*—Kevin L. Ellis
*Assistant Examiner*—Shawn Eland
(74) *Attorney, Agent, or Firm*—Lumen Patent Firm, Inc.

(57) ABSTRACT

The present invention provides a method and apparatus for searching multiple strings within a packet data using deterministic finite automata. The apparatus includes means for updating memory tables stored in a layered memory architecture comprising a BRAM, an SRAM and a DRAM; a mechanism to strategically store the relevant data structure in the three memories based on the characteristics of data, size/capacity of the data structure, and frequency of access. The apparatus intelligently and efficiently places the associated data in different memories based on the observed fact that density of most rule-sets is around 10% for common data in typical network intrusion prevention systems. The methodology and layered memory architecture enable the apparatus implementing the present invention to achieve data processing line rates over 2 Gbps.

17 Claims, 14 Drawing Sheets

OTHER PUBLICATIONS

M. Fisk and G. Varghese "Applying Fast String Matching to Intrusion Detection" [retrieved from the Internet <<URL: http://public.lanl.gov/mfisk/papers/setmatch-raid.pdf>> on Jul. 13, 2004], 21 pages.

R. Franklin, D. Carver, and B.L. Hutchings "Assisting Network Intrusion Detection with Reconfigurable Hardware," *Proceedings*, FCCM 2002, 10 pages.

Z. K. Baker and V. K. Prasanna "Automatic Synthesis of Efficient Intrusion Detection Systems on FPGAs," FPL 2004, pp. 311-321.

Z. K. Baker and V.K. Prasanna, "A Methodology for Synthesis of Efficient Intrusion Detection Systems on FPGAs", IEEE Symposium on Field-Programmable Custom Computing Machines (FCCM), 2004, 10 pages.

Y.H. Cho and W.H. Mangione-Smith "Deep Packet Filter with Dedicated Logic and Read Only Memories," IEEE Symposium of Field Programmable Custom Computing Machines (FCCM), 2004, 10 pages.

S. Dharmapurikar, P. Krishnamurthy, T. Sproull, J. W. Lockwood "Deep Packet Inspection Using Parallel Bloom Filters," IEEE Computer Society, Jan.-Feb. 2004, pp. 52-61.

N. Tuck, T. Sherwood, B. Calder, G. Varghese "Deterministic Memory-Efficient String Matching Algorithms for Intrusion Detection," *Proceedings*, IEEE INFOCOM 2004, 12 pages.

A. V. Aho and M.J. Corasick "Efficient String Matching: An Aid to Bibliographic Search," Communications of the ACM, vol. 18, Issue 6, Jun. 1975, pp. 333-340.

R. Lippmann, D. Fried, I. Graf, J. Haines, K. Kendall, D. McClung, D. Weber, S. Webster, D. Wyschogrod, R. Cunningham, M. Zissman "Evaluating Intrusion Detection Systems: The 1998 DARPA Off-line Intrusion Detection Evaluation," *Proceedings*, DARPA Information Survivability Conference and Exhibition (DISCEX) 2000, IEEE Computer Society Press, Los Alamitos, CA, pp. 12-26.

E.P. Markatos, S. Antonatos, M. Polychronakis and K.G. Anagnostakis "Exclusion-based Signature Matching for Intrusion Detection," *Proceedings*, IASTED International Conference on Communications and Computer Networks (CCN), Cambridge, USA, 2002, pp. 146-152.

I. Sourdis and D. Pnevmatikatos "Fast, Large-Scale String Match for a 10Gbps FPGA-based Network Intrusion Detection System," *Proceedings*, 13th Intl. Conf. on Field Programmable Logic and Applications (FPL2003), Sep. 2003, Lisbon, Portugal, 10 pages.

R. Sidhu and V.K. Prasanna "Fast Regular Expression Matching using FPGAs," IEEE Symposium on Field-Programmable Custom Computing Machines (FCCM), Apr. 2001, 12 pages.

M. Gokhale, D. Dubois, A. Dubois, M. Boorman, S. Poole, V. Hogsett "Granidt: Towards Gigabit Rate Network Intrusion Detection Technology," *Proceedings*, FPL 2002, 10 pages.

J. Moscola, J. Lockwood, R.P. Loui, M. Pachos "Implementation of a Content-Scanning Module for an Internet Firewall," *Proceedings*, FCCM 2003, 8 pages.

I. Sourdis and D. Pnevmatikatos "Pre-decoded CAMs for Efficient and High-Speed NIDS Pattern Matching," *Proceedings*, IEEE Symposium on Field Programmable Custom Computing Machines (FCCM), Apr. 2004, Napa, California, USA, 10 pages.

Y.H. Cho, S. Navab, W.H. Mangione-Smith "Specialized Hardware for Deep Network Packet Filtering,"M. Glesner, P. Zipf, and M. Renovell (Eds.), FPL 2002, LNCS 2438, pp. 452-461.

S. Golson "State Machine Design Techniques for Verilog and VHDL," Synopsys Journal of High-Level Design, Sep. 1994, 11 pages.

R.P.S. Sidhu, A. Mei and V. K. Prasanna "String Matching on Multicontext FPGAs using Self-Reconfiguration," *Proceedings*, 1999 ACM/SIGDA 7th Intl. Symposium on Field Programmable Gate Arrays, Feb. 1999, pp. 217-226.

Z.K. Baker, V.K. Prasanna "Time and Area Efficient Pattern Matching on FPGAs," *Proceedings*, FPGA '04, Feb. 2004, Monterey, California, USA, 10 pages.

\* cited by examiner

Goto Function

| i | 1 | 2 | 3 | 4 | 5 | 6 | 7 | 8 | 9 |
|---|---|---|---|---|---|---|---|---|---|
| F(i) | 0 | 0 | 0 | 1 | 2 | 0 | 3 | 0 | 3 |

Failure Function

| i | 1 | 2 | 3 | 4 | 5 | 6 | 7 | 8 | 9 |
|---|---|---|---|---|---|---|---|---|---|
| Output (i) | 0 | {he} | 0 | 1 | {he, she} | 0 | {his} | 0 | {hers} |

Output Function

SRAM

BRAM

| Rule No. | Cached State (1 bit) | Number of States (16 bits) | BRAM Offset (32 bits) | DRAM Offset for bitmap (32 bits) | DRAM Offset for Next State / Output map (32 bits) | Last Used Timestamp (16bits) |
|---|---|---|---|---|---|---|
| Rule 0 | 0 | NSR0 | 0 | DO1 | NSRO0 | 0 |
| Rule 1 | 1 | NSR1 | BO2 | DO2 | NSRO1 | x |
| : | : | : | : | : | : | : |
| Rule i | 1 | NSRi | BOi | DOi | NSROi | y |
| : | : | : | : | : | : | : |
| Rule k | 0 | NSRk | 0 | DOk | NSROk | 0 |

1101 1102 1103 1104 1105 1106 1107

1100

| Offset | Bitmap |
|---|---|
| BO2 | Bitmap for Rule-set 2 |
| BOi | Bitmap for Rule-set i |
| : | : |

LAYERED MEMORY ARCHITECTURE FOR DETERMINISTIC FINITE AUTOMATON BASED STRING MATCHING USEFUL IN NETWORK INTRUSION DETECTION AND PREVENTION SYSTEMS AND APPARATUSES

FIELD OF THE INVENTION

The present invention relates generally to network intrusion detection and prevention systems and apparatuses. More particularly, it relates to a layered memory architecture for high rate text search/string matching useful in the network intrusion detection and prevention systems and apparatuses, the invention achieving high rate with intelligent memory partitioning among layers of memories based on characteristics of data.

DESCRIPTION OF THE BACKGROUND ART

With increasing attacks on computer network security, content-based detection of intrusion and subsequent prevention continue to evolve. Network intrusion detection and prevention systems and appliances such as firewalls, switches, and the likes are becoming common in various computing environments. Researchers and engineers continue to develop new techniques, methodologies, and systems to search multiple patterns in software and hardware.

However, even with ongoing researches and technological advances, certain old challenges remain and new challenges emerge. For example, increasing network speeds seem to work against the requirement to remain line-speed. Moreover, as the number and variety of attacks continue to increase, so do the patterns to be searched and matched. Today, string matching remains computationally intensive and still requires storing a large number of state machines (finite automata) that are necessary to match patterns. Since fast memories are expensive and cheaper memories are slow, an undesirable contention between cost and performance seems unavoidable.

Several approaches have attempted to resolve this contention. An approach conserves memory by regenerating all state machines and starting over again any time there is a change in the rule-set. This is not desirable because it requires laborious reprogramming of logic.

Another approach conserves memory by limiting the number of rules (patterns*characters). With this approach, high performance is achieved for small sets of rules, but lacks scalability. In other words, increasing the size of the rule-sets will dramatically decrease the performance of the systems, if no compensatory measure is taken. As such, most researchers tend to use packet level parallelism to achieve higher bandwidth, i.e., multiple copies of the automata work on different packets at lower rate, see, e.g., Cho et al. "Specialized Hardware for Deep Network Packet Filtering" FPL 2002, LNCS 2438, pp. 452-461, 2002, and "Deep Packet Filter with Dedicated Logic and Read Only Memories," 12th Annual IEEE Symposium on Field Programmable Custom Computing Machines 2004 (FCCM '04), pp.1-10.

Most modern systems adopt rules from an open source network intrusion detection system known as the Snort™ (Snort™ is a trademark of Sourcefire, Inc. of Columbia, Md., USA). Many researchers have proposed various ways to cover all or most of the Snort™ rules, available online from <http://www.snort.org>.

Most proposed designs need multiple FPGAs to cover the existing Snort rule set, see, e.g., Sourdis et al. "Fast, Large-Scale String Match for a 10 Gbps FPGA-based Network Intrusion Detection System," Proceedings of the 13th International Conference on Field Programmable Logic and Applications (FPL2003), Sep. 1-3, 2003, Lisbon, Portugal. Sourdis et al. disclose that, for pattern matching, three FPGAs of 120,000 logic cells are needed to include the entire Snort collection, at which time contained less than 1500 patterns, with an average size of 12.6 characters. Four devices are needed to include the entire Snort rule set including header matching. These calculations do not include area optimizations.

Overall, most designs are dependent on either high on-chip bandwidth, which allows data to be shuttled to large matching units, or fairly high percentages of control routing and high logic complexity. Both of these characteristics go against scalability of systems.

The scalability is also affected by the underlying string matching algorithm. Most network intrusion detection and prevention systems employ or are based on the string searching algorithm by A. V. Aho and M. J. Corasick, "Efficient String Matching: An Aid to Bibliographic Search," Communications of the ACM, 18(6):333-340, June 1975. The Aho-Corasick algorithm is a dictionary-based string searching algorithm that locates elements of a finite set of patterns (the dictionary) within an input text. Generally, the algorithm constructs a finite automaton first and then applies that automaton to the input text. When the pattern dictionary is known in advance (e.g., a computer virus database), the construction of the automaton can be performed once off-line and the compiled automaton stored for later use.

Aho-Corasick is known to have deterministic worst-case lookup times as well as data structure suitable for wire (line) speed hardware-based string matching. The classical Aho-Corasick data structure takes more storage space than typical available SRAM on a processing system.

For example, a state table with 16,384 active states will take up 256*16384*16 bits=8 Mbytes of memory. Depending on the type of packet, several of such state tables could be required in memory. If we were to implement this design on a field programmable gate array (FPGA), the maximum block RAM (BRAM) available in a known FPGA device such as the Xilinx Virtex-II Pro would be of the order of 738 Kbytes. At a line-rate of 2 Gbps (processing throughput), a byte needs to be processed every 4 ns. If we were to implement this on a 100 MHz logic, we would have a clock cycle of 10 ns. Therefore, 2.5 bytes would need to be processed every cycle to match the line-rate. In other words, we would need a minimum of three threads to handle the traffic at the specified line-rate from the processing perspective.

In addition, in the classical Aho-Corasick data structure, assuming that it takes 16 bits to store a state, 512 bytes would need to be allocated in the local memory for every incoming character. In a naive implementation for the worst case scenario, this means that a 2 Gbps traffic will lead to 1024 Gbps memory bandwidth, which is enormous. Under certain circumstances, it is possible to achieve 10 Gbps/channel sustained memory bandwidth with cost effective DRAMs. We can therefore easily see that the difference between what is achievable and what is required is still significant and substantial.

In addition to the fundamental limitations imposed by the Aho-Corasick algorithm and its data structure, another important performance-influencing factor relates to the very nature of finite automata. A finite automaton (state machine) processes an input string and either accepts or rejects it. The operation of finite automata is limited to one character per cycle operation. Both deterministic finite automata (DFA) and non-deterministic finite automata (NFA) are common techniques to perform hardware-based text search, see, e.g., Sidhu et al. "Fast Regular Expression Matching using FPGAs," IEEE Symposium on Field-Programmable Custom Computing Machines (FCCMO1), April 2001, pp. 1-12. A DFA is derived or constructed from an NFA, which generally can be directly implemented with FPGA hardware. A NFA, however, is not suitable for serial, software implementation, hence the conversion to a DFA.

In the U.S. Published Patent Application No. US2003/0065800, Wyschogrod et al. disclose a DFA based approach that groups transitions into classes to conserve memory. According to Wyschogrod et al., a character class is defined as a set of characters that cause the same state transitions. A careful analysis of a typical intrusion string data in, for example, the Snort rule-sets, leads to the observation that very few character classes are generated because of the same state transitions, except those that are generated because of failure transitions leading to idle or initial state.

Today, challenges remain in improving efficiency, flexibility, cost-effectiveness, speed, and performance of network intrusion detection and prevention systems and appliances. Confronted daily by the ongoing, increasing attacks, there is a strong need and desire in the network security art for a viable and effective mechanism, system, and apparatus that can substantially reduce the amount of storage in memory and memory bandwidth, thereby significantly increasing the much needed speed and performance and improving the highly desired efficiency, flexibility, and cost-effectiveness. The present invention addresses this need.

SUMMARY OF THE INVENTION

A goal of the present invention is to provide a new and inventive method, system, and apparatus capable of reducing the memory bandwidth typically required for string matching in conventional network intrusion detection systems. This goal is in a layered memory architecture that meets the line-rate requirement for string matching, achieving a full-duplex Gigabit line-rate over and above 2 Gbps (Gigabit per second).

We observe, and the present invention takes advantage the observed fact that in typical string matching rules for intrusion prevention, the nodes are very dense near the root of the state machine. Further away from the state machine, the nodes become long sequential strings with only one valid next state each. Most characters, when not matching, lead back to the initial state. The density of Snort 2.2-ORC 1 dataset downloaded on Jul. 27, 2004, with all rules enabled, can be derived from the number of transitions (1122569), the number of states (49168), and the alphabet size (256) to be 1122569/(49168*256)=0.089 or about 9%. Thus, if the probability density of characters is uniform in an Internet packet, it can be assumed that around 9% of the characters have a transition to a state other than the idle state. This observation provides the foundation on which we exploit memory partitioning.

According to an aspect of the present invention, memory required for string matching is stratigically and effectively partitioned in such a way as to minimize memory accesses for large tables (structured data) that need to be stored. This is achieved by keeping bulk data in a large memory such as a DRAM and more frequently used tables in faster and smaller memories such as a BRAM and an SRAM.

Dynamic RAM (DRAM) provides fast access to memory combined with large capacity. However, DRAMs have a large setup time before data can be retrieved. With a 512 bit burst size and 166 MHz clock-rate, it is possible to achieve 10 Gbps sustained rate using Double Data Rate (DDR) SDRAMs.

Static RAM (SRAM) provides fast access to memory but has limited capacity. The setup time is shorter than DRAMs. A representative SRAM has 5 cycles/access for 2 cycles worth of data. Assuming a 133 MHz clock rate, i.e. 7.5 ns for a clock cycle, it takes 7.5*5=37.5 ns for us to get 64 bits assuming a 32 bit wide bus. This leads to 1.7 Gbps memory bandwidth.

Block RAM (BRAM) within FPGAs provides fastest access to memory but has even more limited storage capacity. DRAM, SDRAM, DDR-SDRAM, SRAM, BRAM, and FPGA are well known in the art and thus not further described herein.

One skilled in the art will appreciate that the present invention is not limited by the specific types of memory listed here. Rather, they serve as an example on how to implement the layered memory architecture disclosed herein. It is anticipated that other suitable memory or storage means could become available to implement the present invention as the memory technology continues to evolve and advance.

An object of the present invention is to provide a method of memory partitioning and corresponding data structure such that:

most used data resides and are cached in a BRAM and are replaced if there is a requirement to bring another set of data;

larger data that fit in an SRAM is advantageously placed there;

bulk data that needs to be read as a burst is placed in a DRAM so that the overall memory bandwidth requirement is under the bandwidth achievable by the DRAM; and multiple threads work on multiple packets simultaneously so that line rate can be achieved while keeping the latency to within allowable limits.

Still further objects and advantages of the present invention will become apparent to one skilled in the art upon reading and understanding the preferred embodiments described below with reference to the following drawings.

BRIEF DESCRIPTION OF THE DRAWINGS

FIG. 11 shows the contents of a BRAM in an embodiment of this invention.

DETAILED DESCRIPTION

Figure 1:
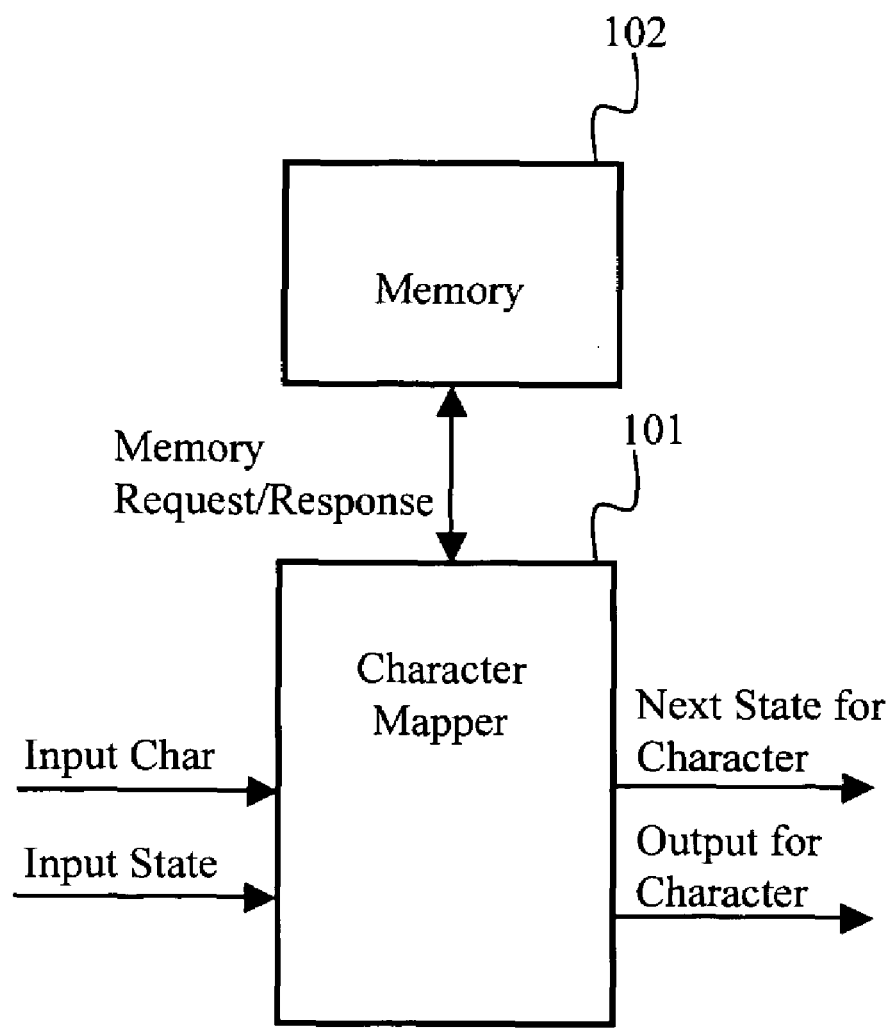
FIG. 1 illustrates an exemplary apparatus implementing an aspect of the present invention. The apparatus gets the next state for the input character, given the present state, and provides matching outputs if the next state is an output state.

FIG. 1 shows a diagram of a canonical state machine block 100 for finding the next state, given the incoming character and current state. To obtain the next state the Character Mapper 101 has to access the memory 102. If the new state matches a known string, the condition is provided as an output. The speed with which this machine can operate therefore primarily depends on the amount of time it takes to access the memory.

Figure 2:
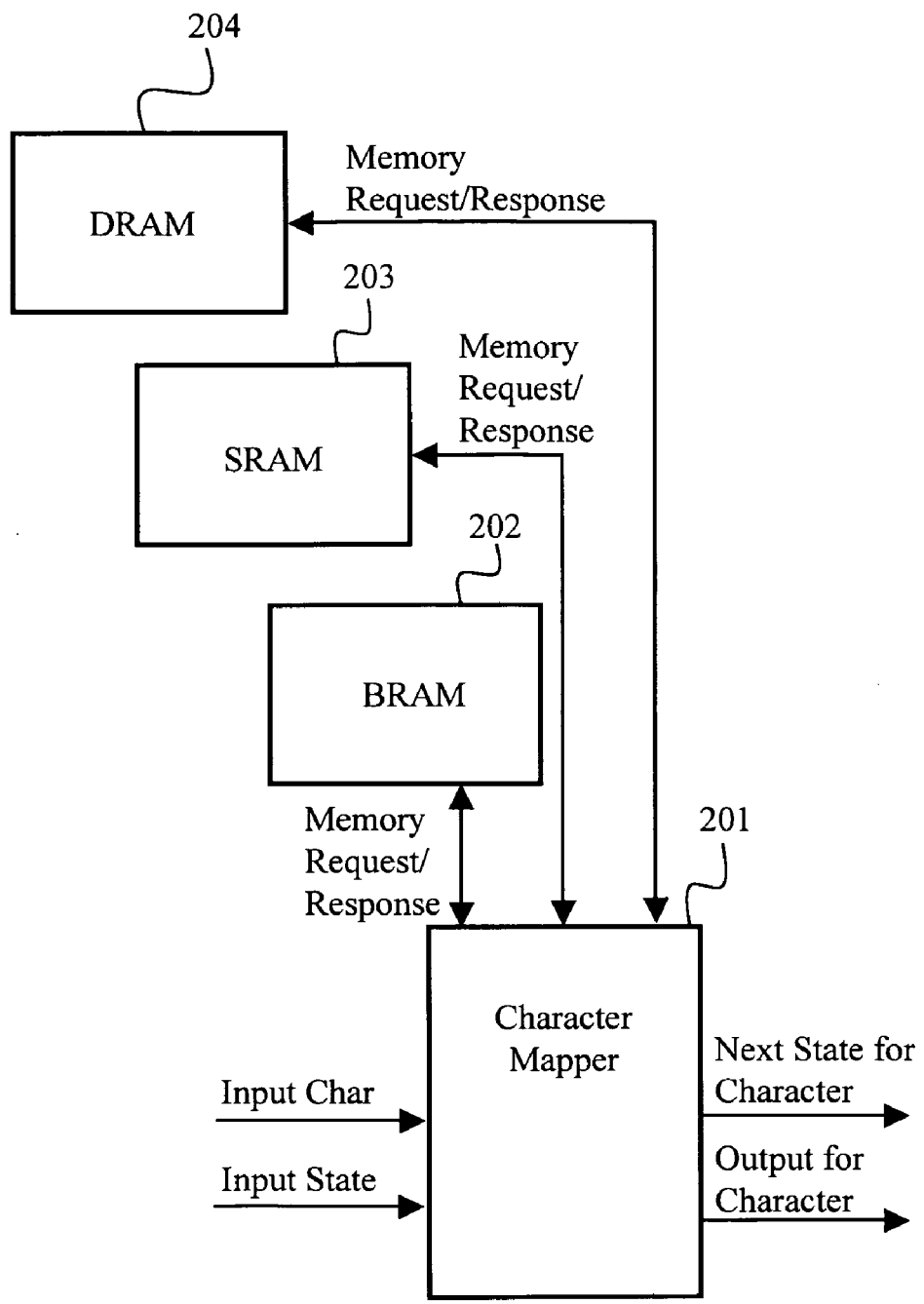
FIG. 2 illustrates a second level conceptual detail of FIG. 1.

FIG. 2 further illustrates the block 100 of FIG. 1 in detail. The Character Mapper 201 is connected to three memories: BRAM 202, SRAM 203, and DRAM 204. Each memory has its own characteristics in terms of capacity, latency, speed and width of access. In general, DRAM has the largest capacity (of the order of Gigabytes), followed by SRAM (of the order of few Megabytes), and then followed by BRAM (of the order of a Megabyte). In terms of the width of memory, DRAM typically is optimized to operate with wider widths of access. This is followed by SRAM, and then followed by BRAM. Therefore, DRAM access is usually in bursts of bytes rather than individual bytes.

Given these observations, the Character Mapper 201 is advantageously configured in such a way as to utilize and access 1) DRAM 204 for bulk data and only when necessary; 2) SRAM 203 when the access is of shorter widths and capacity required is higher than BRAM 202 but lower than DRAM 204; and 3) BRAM 202 for all cached data. This configuration conserves fast memory and allows cached data to be accessed quickly and often.

Figure 3:
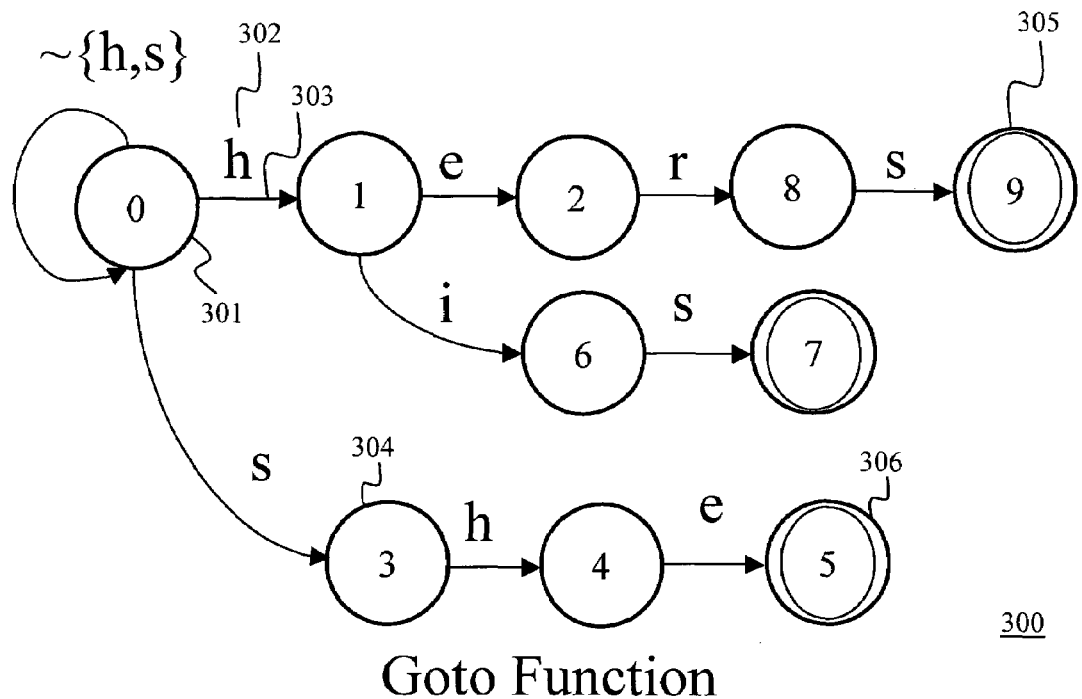
FIG. 3 exemplifies a pattern matching machine and Goto, Failure and Output functions thereof.

FIG. 3 illustrates a pattern matching machine 300 with corresponding Goto, Failure, and Output functions. In this exemplary embodiment, the pattern matching machine 300 implements the Aho-Corasick algorithm for patterns 'he', 'she', 'his', and 'hers'.

In machine 300, state 301 is the initial state (state 0). States such as state 9 marked with a double-circle 305 are output states. The arrow 303 denotes transition from one state to another based on a character 302, in this case, 'h'. For the sake of clarity, failure transitions and output transitions back to the idle state 0 are not shown in the diagram.

Table 310 exemplifies Failure Function F(i). Given a state, if no match is found in the Goto Function of machine 300, the Failure Function F(i) operates to compute the next state. For example, in state 304 (state 3), if the next character is 'A', the next state is calculated as 0 due to a match failure.

Table 320 exemplifies Output Function Output (i), which determines what strings, if any, have matched in a new state. For example, if the state machine 300 arrives at state 306 (state 5), it means that strings 'he' and 'she' have been found. This classical state machine parses the patterns using the Character Mapper 101. Preferably, the Character Mapper 201 is employed.

Figure 4:
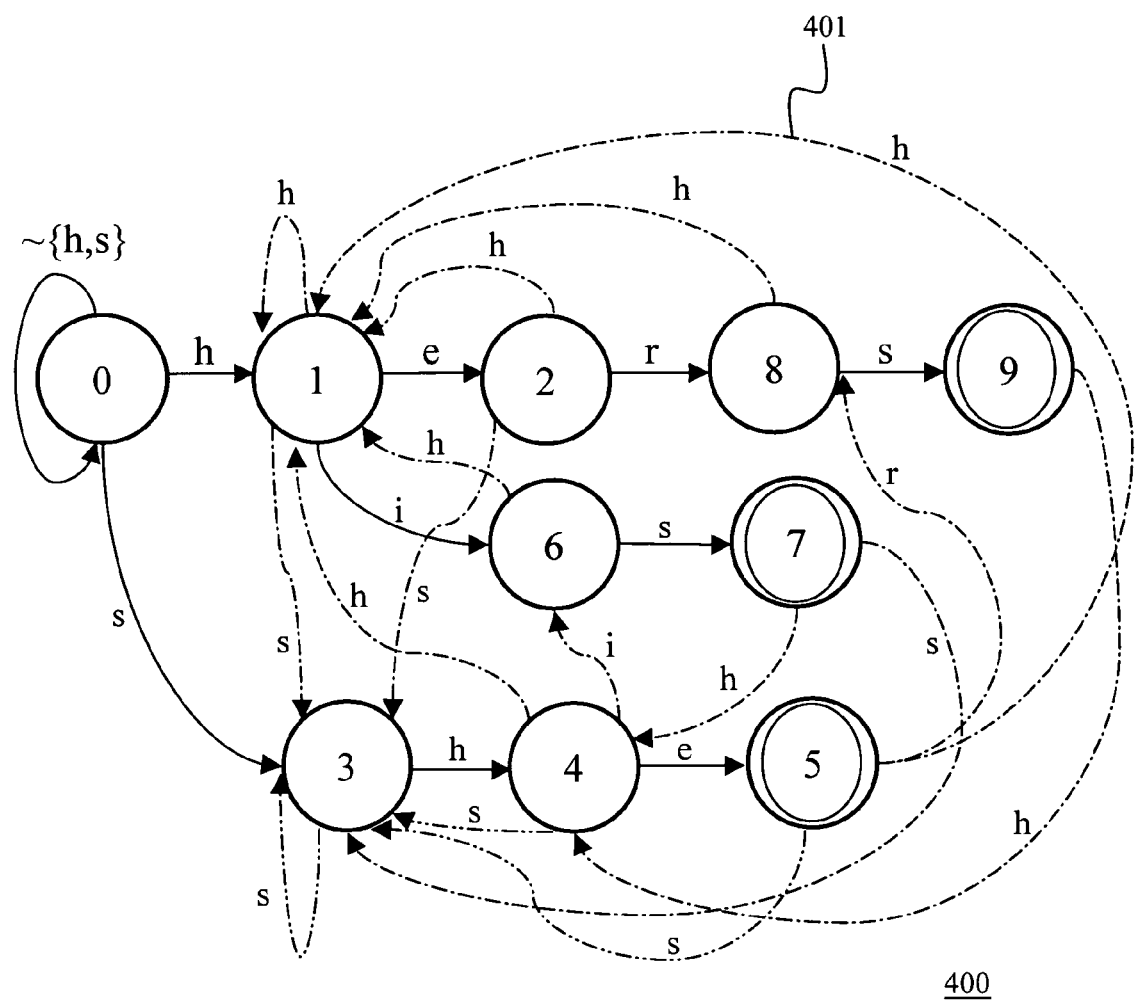
FIG. 4 represents the deterministic finite automaton corresponding to FIG. 3, with failure transitions except those that go back to the initial state.

FIG. 4 is a graphical representation of a deterministic finite automaton (DFA) corresponding to FIG. 3. All transitions, including failure transitions, of a pattern matching machine 400 are shown in FIG. 4, except those to the idle state 0. Dashed transitions illustrate from what state to what state each character will lead, e.g., transition 401 shows that character 'h' will lead to transition from state 5 to state 1.

Figure 5:
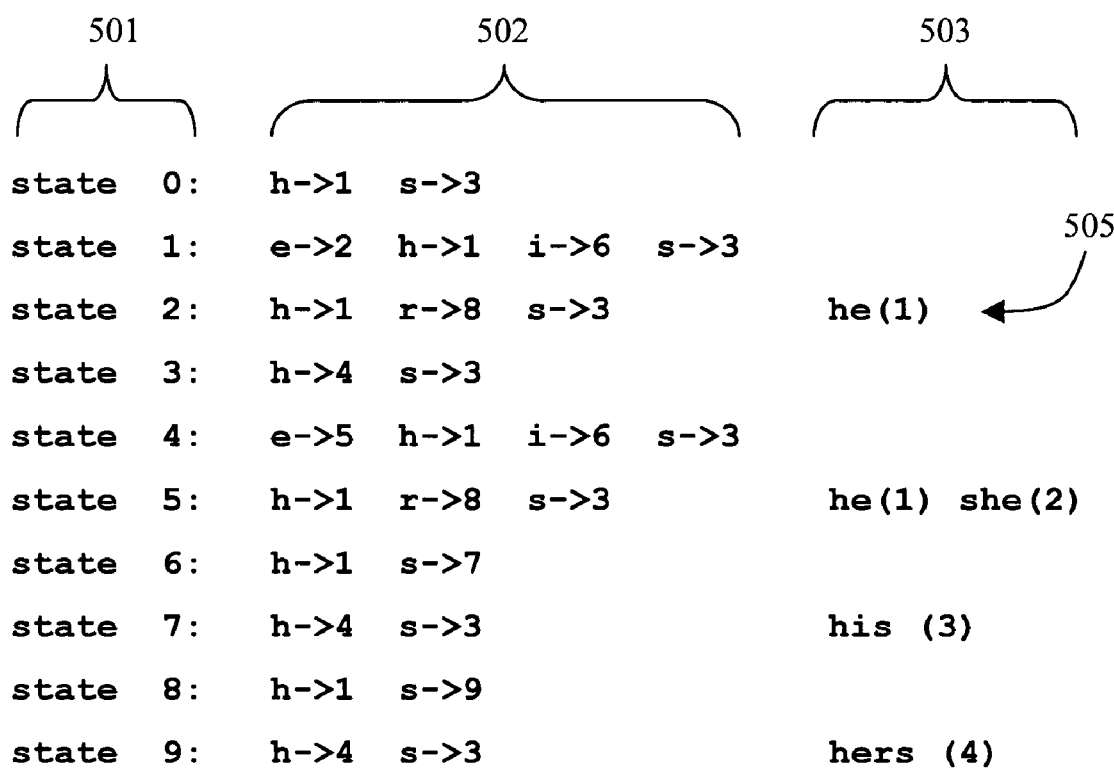
FIG. 5 presents FIG. 4 in a tabular manner with outputs, if any.

FIG. 5 further illustrates the DFA of FIG. 4 in a tabular form 500. The first column 501 lists the current state. The second column 502 lists the transition with a given character. For instance, an input character 'h' in state 0 will lead to transition to state 1, an input character 's' in state 0 will lead to state 3, and all other characters will force transition to state 0. Similarly, in state 8, character 'h' will force transition to state 1, character 's' will force transition to state 9 and all other characters in state 7 will lead back to state 0. Outputs from a state are listed in the last column 503, if present. For example, state 2 corresponds to output 'he' 505. If the automaton arrives here, it means that string 'he' has been matched.

We now analyze Table 500 as follows. The total number of states is 10 (column 501). The total number of state transitions is 26 (column 502). Assuming an input alphabet size of 256 ASCII character set, the density of the matrix can be determined by the following equation:

$$\text{number of transitions}/(\text{number of states} * \text{alphabet size}) = 26/(10 * 256)$$

$$= 0.0101$$

$$= 1\%$$

Therefore, if we assume a uniform distribution of characters in the incoming stream, for a given character, the probability that it will lead to a transition to a state other than idle state is only 1% in this case. This number can be calculated to around 10% for Snort, open-source intrusion detection software, with all rules enabled, as of July 2004.

With this knowledge, we construct a layered memory architecture to manage and partition the memory as follows. We create a state-wise character-set-wise bitmap for every state in a rule-set, so that it can be kept in a local BRAM memory and accessed in a very short duration. We know 256 characters for a state will take 32 bytes. The total bytes required for a rule-set is therefore 32 times the number of states ($S_n$) in the rule-set. This means that the total bytes required for all the rule-sets are $\Sigma(32*S_n)$, summed over all rule-sets.

For the same Snort data set, the largest number of states is about 8192 states. Rule-sets are of the order of 256 and the mean number of active states is around 712. Therefore, the total memory required for all state-wise character-set-wise bitmap is around 5.6 MB, while the largest bitmap requires 256 KB of memory. The layered memory architecture thus is designed to cache memory from a DRAM to a BRAM as and when required for a rule-set.

Figure 6:
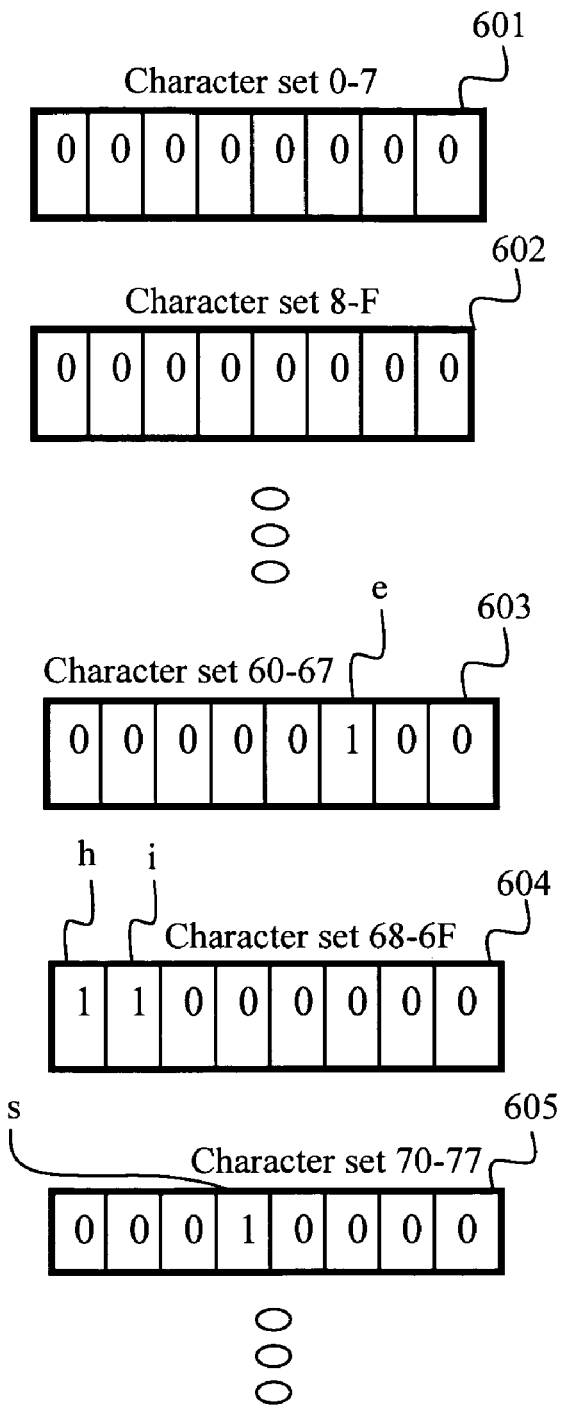
FIG. 6 shows the character-set-wise bitmap for state 1 in FIG. 4. Each 8bit-octet corresponds to a set of 8 characters.

FIG. 6 illustrates, by way of example, how character-set-wise bitmaps are stored for a state, in this case, for state 1. Referring to FIG. 5, state 1 has 4 transitions, viz. e→2, h→1, i→6, s→3. Therefore, except for characters e (0x65), h (0x68), i (0x69), and s (0x73), all other characters transition to idle state 0. Each character occupies a bit. The bits for the four characters, e, h, i, and s, are set to 1 and the rest are set to 0. This is shown in FIG. 6 where all bits of character-set 0-7 (601), character-set 8-F (602), and so on are set to 0. Character-set 60-67 (603), character-set 68-6F (604), and character-set 70-77 (605) have bits corresponding to characters e, h, i, and s set to 1. The rest of the bits in the same character-sets are set to 0.

Figure 7:
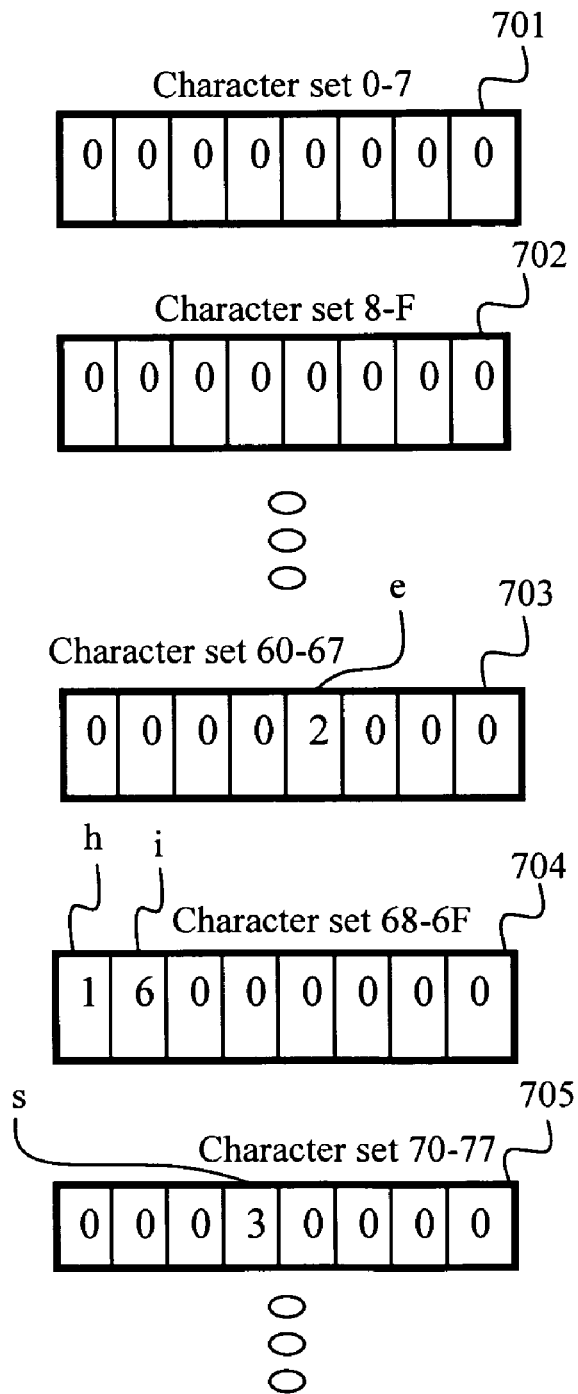
FIG. 7 shows the character-set-wise next-state map for state 1 in FIG. 4.

FIG. 7 illustrates, by way of example, how character-set-wise next-state bitmaps are stored for a state, in this case, for state 1. Each character occupies a space corresponding to size required for the state. In an embodiment of this invention, this space is 16 bits. Referring again to FIG. 5, state 1 has 4 transitions, viz. e→2, h→1, i→6, s→3. Therefore, except for characters e (0×65), h (0×68), i (0×69), and s (0×73), all other characters transition to idle state 0 in character sets 701, 702, 703, 704, 705, etc. The next states for the four characters, e, h, i, and s, are set to 2, 1, 6, and 3, respectively, and the rest are set to 0.

Figure 8:
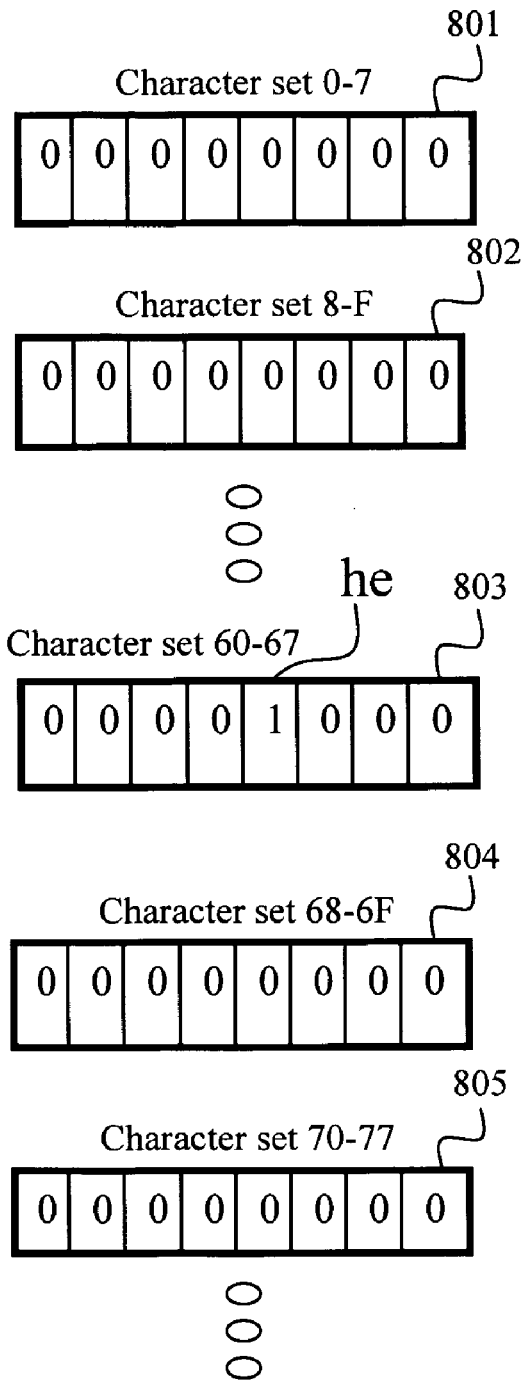
FIG. 8 shows the character-set-wise output bitmap for state 1 in FIG. 4.

FIG. 8 illustrates, by way of example, how the state-wise character-set-wise output bitmaps are stored, in this case, for state 2. As in FIGS. 6 and 7, each character occupies a bit in FIG. 8. Referring to FIG. 5, state 1 has 4 transitions, viz. e→2, h→1, i→6, s→3. Except for character e (0×65), which leads to state 2 with an output, no other character has a state that transitions to an output state. Bits for all characters except e therefore are set to 0 in character sets 801, 802, 803, 804, 805, etc.

Figure 9:
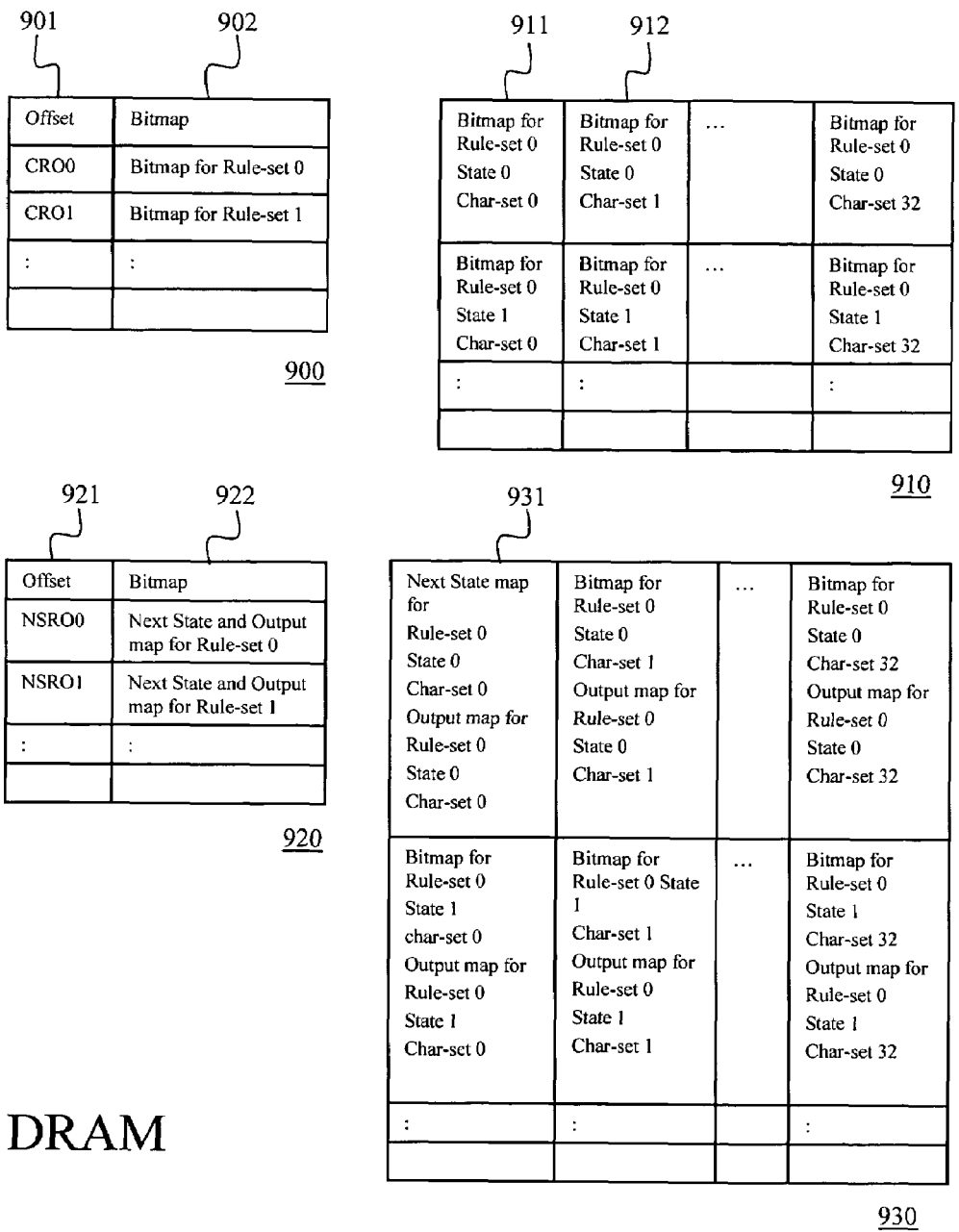
FIG. 9 shows the contents of a DRAM in an embodiment of this invention.

FIG. 9 illustrates the contents of a DRAM implementing the present invention. Tables 900, 910, 920, and 930 show some of the key information stored in the DRAM, according to an exemplary embodiment of this invention.

Table 900 contains the bitmaps for all rule-sets. Each rule-set has an offset associated therewith. In this example, the character bitmap for rule-set 0 is stored at location CRO0 and the character bitmap for rule-set 1 is stored at location CRO1, and so on, as indicated by columns 901 and 902.

Table 910 contains further details of Table 900. The bitmap for state 0 of rule-set 0 is depicted in the first row, the bitmap for state 1 of rule-set 0 is depicted in detail in the second row, and so on. Since each byte contains 8 bits, each character-set of 8 characters can fit in one byte, e.g., 911, 912, etc. There are 32 such character sets stored in each row for a state. A rule-set has several such states. Each state is thus stored as 32 bytes of information.

Table 920 contains bitmaps for next states and output bitmaps for all rule-sets. Each rule-set has an offset associated therewith. In this example, the map for rule-set 0 is stored at location NSRO0, the map for rule-set 1 is stored at location NSRO1, and so on, as indicated by columns 921 and 922.

Table 930 contains further details of Table 920. The map for state 0 of rule-set 0 is depicted in the first row, the map for state 1 of rule-set 0 is depicted in detail in the second row, etc.

There are two maps in each sub-block of column 931—one that specifies the next state for each of the 8 characters and one that specifies whether there is an output for the next state corresponding to each of the 8 character in the set. Each sub-block therefore contains (16*8)+8=136 bits. There are 32 such sub-blocks for each state. A rule-set has several such states. Each state is thus stored as a set of this information. Depending on the number of rule-sets, there is a plurality of such sets in the memory. Since a DRAM is usually accessed as a burst, even though the space required for the sub-block is 136 bits, the actual space reserved for the sub-block may be 512 bits in an exemplary embodiment of this invention.

Figure 10:
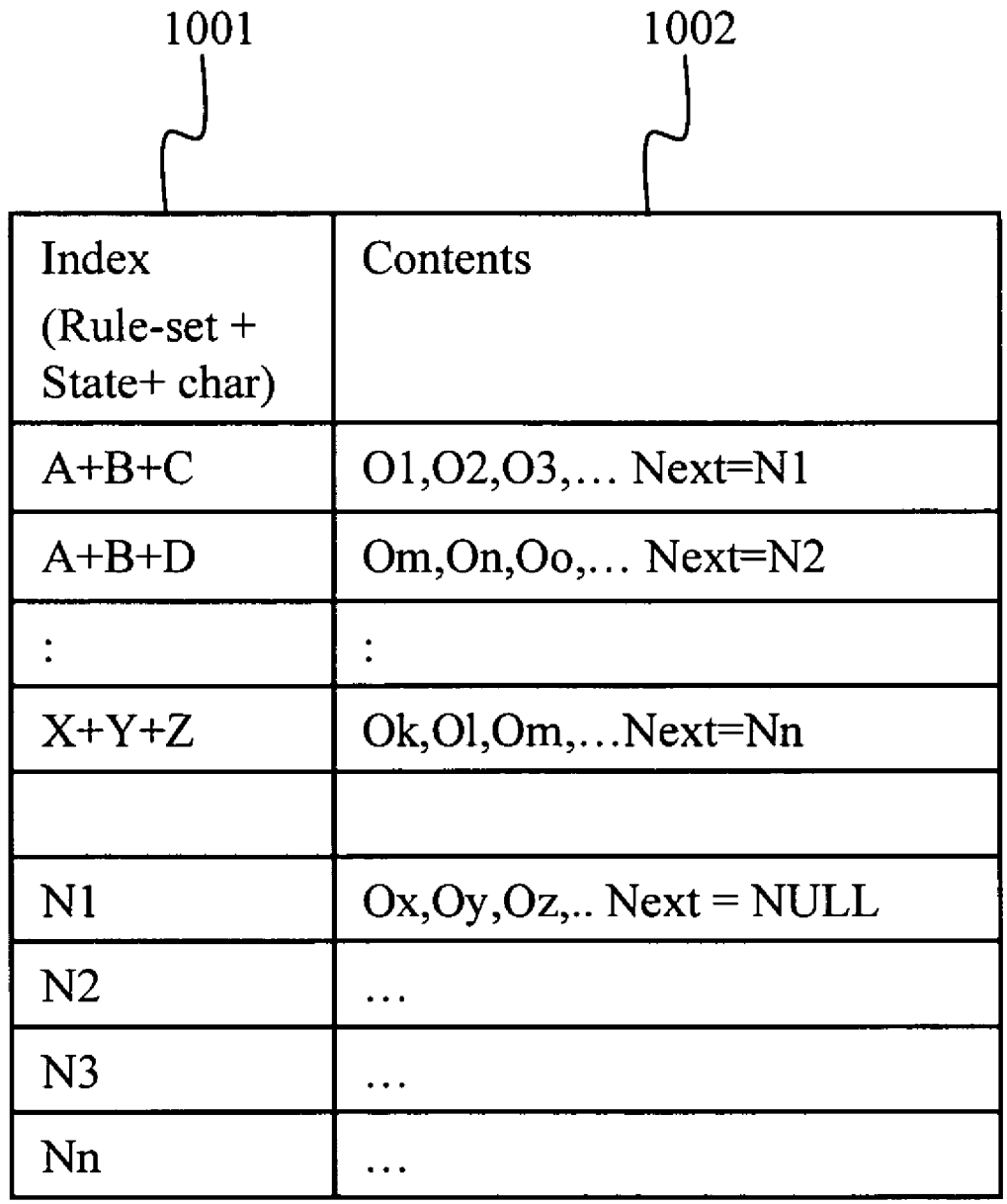
FIG. 10 shows the contents of an SRAM in an embodiment of this invention.

FIG. 10 illustrates the contents of an SRAM. In an exemplary embodiment of this invention, Table 1000 is a 5120 bytes table that is 80 bits wide and composed of some of the key information in the SRAM. Table 1000 depicts the output table for a tuple consisting of Rule-set, State and Char. The tuple content field is indicated in column 1002. This tuple is used to index Table 1000, as indicated by column 1001. The output data is stored as a linked list using a hash-based mechanism. The outputs for that tuple are obtained from the SRAM memory. The output bitmap in Table 930 of FIG. 9 specifies whether there is an output for the next state. In comparison with the total number of states, there are very few output states. Access to this SRAM memory is thus limited, i.e., only when there is a string match found. This is why Table 1000 is strategically placed in the SRAM.

FIG. 11 illustrates the contents of a BRAM. Table 1100 and 1110 show some of the key information stored in the BRAM, according to an embodiment of this invention.

In this example, Table 1100 is 8256 bytes and 129 bits wide and contains the properties of rule-sets. In a preferred embodiment, the actual space reserved per row maybe 512 bits to make it compatible with DRAM access width. Table 1100 is implicitly indexed using the rule-set number 1101. Column 1102 contains the cached status of the rule-set. If the rule-set is currently cached in the BRAM, the bit corresponding to the rule-set is set to 1. Column 1103 specifies the number of states in the rule-set. Column 1104 specifies the BRAM offset for the rule-set once it is cached in the BRAM. Otherwise, it remains 0. Column 1105 specifies the DRAM offset for the state-wise character-set wise bitmap for the rule-set. This offset location is used to read the rule-set information from the DRAM to cache into the BRAM. Column 1106 specifies the DRAM offset for the state-wise-character-set-wise next-state and the output map for the rule-set. This location is used to fetch the corresponding map to registers when the bitmap specifies a 1 for the character. Column 1107 is used for dynamic caching from the DRAM. The timestamp in this location indicates when this rule was last used. This is necessary for the least recently used (LRU) strategy for cache replacement.

LRU uses the recent past as an approximation of the near future, and replaces the cached object that has not been used for the longest period of time. LRU associates with each cached object the time of its last use. When a cached object must be replaced, LRU chooses the object that has not been used for the longest period of time.

Table 1110 specifies the actual BRAM locations where the bitmaps are used. Columns 1111 and 1112 show offset BOi and where a corresponding bitmap for rule-set i is stored in the BRAM. As discussed before, once an output bitmap for a rule-set has been cached in the BRAM, its offset is stored in Column 1104 of Table 1100.

Figure 12:
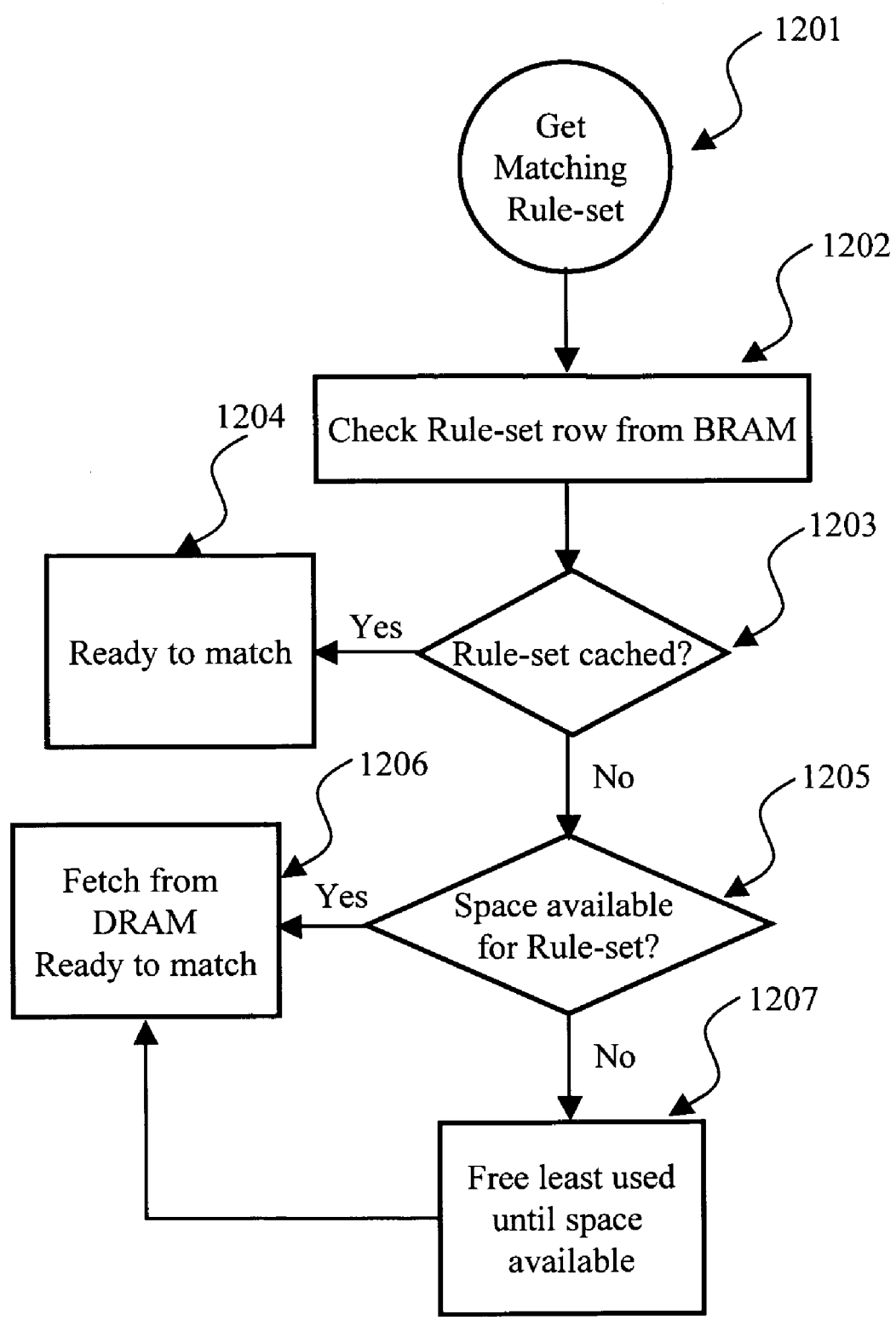
FIG. 12 illustrates the process of caching, if required, the next rule-set's bitmap in the BRAM from the DRAM, given the rule-set.

FIG. 12 illustrates the process flow of how a rule-set is cached from DRAM to BRAM, if required. In step 1201, when an incoming packet is determined to match a particular rule-set, its properties must be available in the BRAM for line-rate matching. The rule-set number of the incoming packet is used as an index to search Table 1100 in step 1202. Column 1102 of the Table 1100 is checked in step 1203. If the rule-set is cached, the rule-set is ready to match through step 1204. At this stage, column 1106 is updated with current time to signal that the rule-set was recently used. If the rule-set is not cached, step 1205 checks if there is a space available in BRAM necessary for caching the rule-set. Column 1103 is used to determine the size of the space required to cache the rule-set.

If a space is available, in step 1206, the rule-set properties are fetched from DRAM location specified in column 1105. Once the rule-set is cached, column 1106 is updated with the current time for the current rule-set.

If the necessary space is not available, the LRU cache strategy is applied on column 1106 in step 1207 to free up the space until a suitable space is available. Once the necessary space is available, the rule-set properties are fetched from DRAM into BRAM in step 1206.

Figure 13:
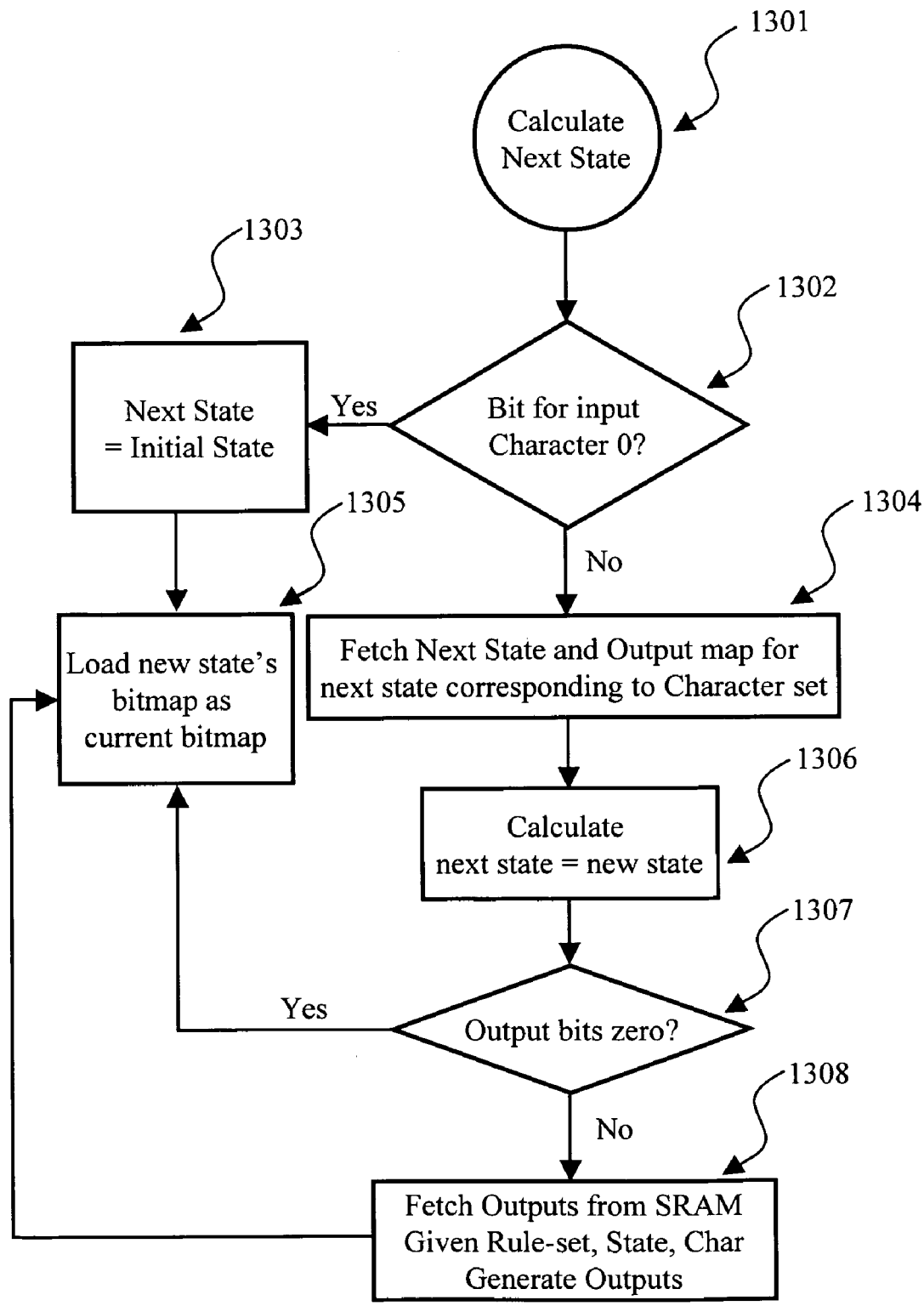
FIG. 13 illustrates the process of determining the next state and any output from the current state, given the input character.

FIG. 13 illustrates the process flow of calculating the next state, given the current state and the incoming character. When an incoming packet arrives in step 1301, it is assumed that the rule-set is already cached due to the steps specified in FIG. 12. The incoming character (divided by 8) is used as an index into the cached bitmap of the current rule-set for the current state from Table 1110 discussed earlier. In an exemplary embodiment of this invention, the address of the exact byte and bit location is given by:

Byte Offset=(Current state*32)+(character code/8); and

Bit Offset within Byte=(Character Code) Modulo 8.

The bit position is checked in step 1302 to be 0 or 1. If it is 0, the next state is idle or initial state, as shown in step 1303. New state is now set as the current state in step 1305.

If the bit position is 1, the next state needs to be fetched from DRAM. Step 1304 is executed to fetch the corresponding next state and output map, from DRAM, as described earlier. DRAM Offset specified in column 1106 is used to fetch the sub-block corresponding to the character within the state. In an exemplary embodiment of this invention, the address of the sub-block corresponding to the character is given by:

$DRAM$ byte Offset = $DRAM$ Offset for next state output map +

((Current state $*32*512$)/8) + ((Character Code/8) $*512/8$).

Once the sub-block at this address is fetched, it can be used to determine the next state in step 1306 and whether the next state has an output in step 1307. During step 1306, in an embodiment of this invention, the next state offset can be calculated as:

Next State Offset=(Character Code % 8)*16, where

Next State is an unsigned 16-bit number at this offset.

Similarly, in an embodiment of this invention, the next state output bit can be calculated as:

Output Byte Offset=128; and

Output Bit Offset=(Character Code % 8), where

Character Code is a 1-bit number.

If the next state has no output, the next state is set as the current state in step 1305. If the next state has outputs associated with it, the corresponding outputs need to be fetched from SRAM in step 1308. To fetch the outputs in step 1308, in a preferred embodiment of the invention, the tuple (rule-set, state and character value) is used as an index for the hash-based Table 1000 in the SRAM. This table may have one or more links due to hash collision. Those aware of the art can implement such a scheme easily. A tuple may contain more than one output.

Once the outputs have been signaled, the next state is set as the current state in step 1305. The state machine proceeds back to step 1301 until all input characters present in the packet are checked.

Figure 14:
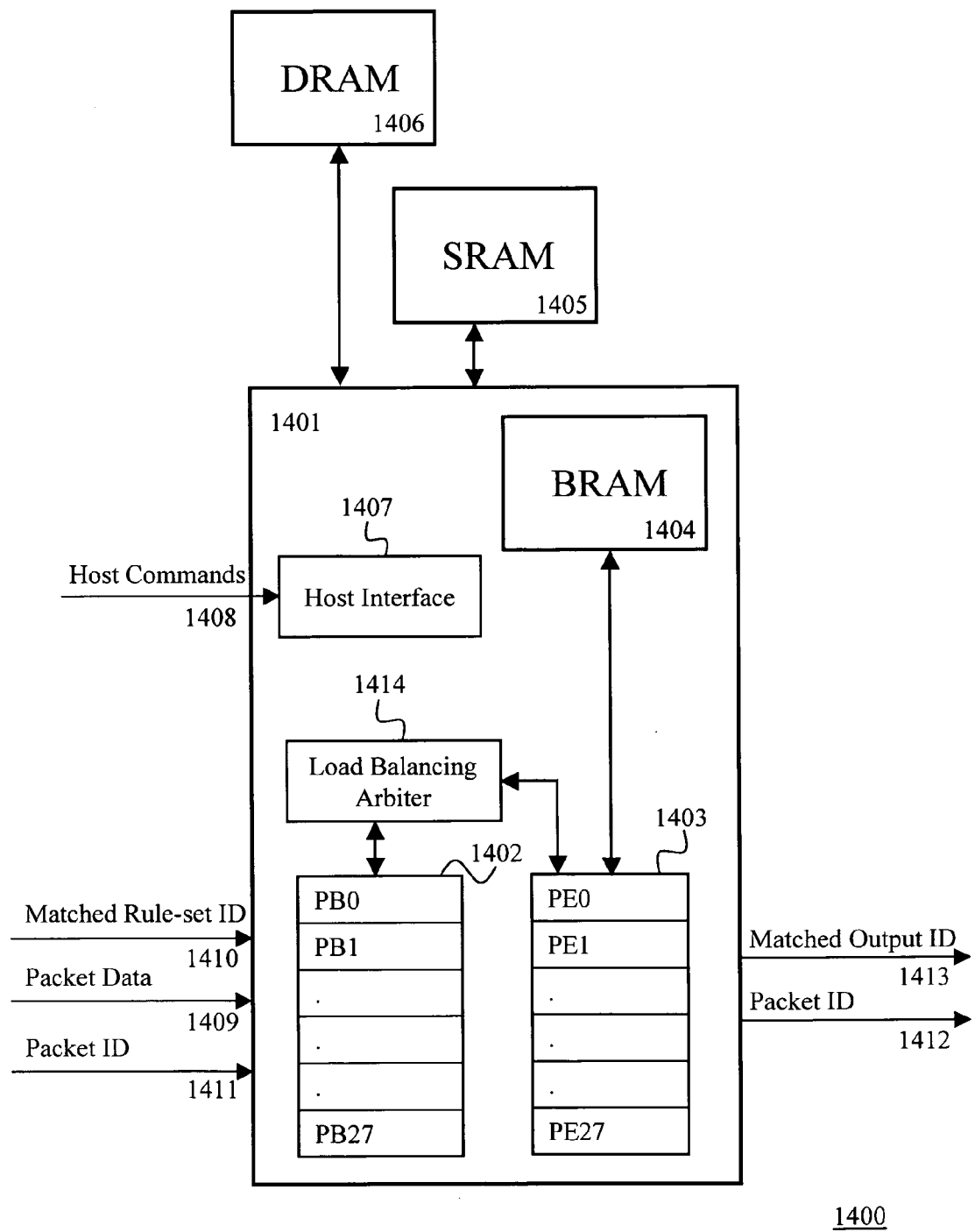
FIG. 14 illustrates an exemplary embodiment of the present invention for content inspection with multiple threads and multiple packet buffers.

FIG. 14 depicts a preferred embodiment 1400 of key components of the invention. Packet processor 1401 is implemented on an FPGA with multiple simultaneous threads of hardware logic PE0 through PE27 shown as 1403. The processing engines can operate asynchronously. In another embodiment of this invention, this could be a network processor with multiple processing engines. Each processing engine PEn has a corresponding packet buffer PBn shown as 1402. Thus, the system can simultaneously operate at several packets.

The Host Interface block 1407 allows an outside host to initialize the memories BRAM 1404, SRAM 1405, and DRAM 1406 to necessary values required for operation of the state machine. This is done via host commands 1408.

All of the processing engines 1403 and Host Interface 1407 have access to the three memories DRAM 1406, SRAM 1405, and BRAM 1404. As packet data 1409 arrives, it is associated with a matching rule-set id 1410 and a packet ID 1411. The output ID 1413 related to string matches, if any, is associated with the packet ID 1412. A Load Balancing Arbiter 1414 optimally assigns incoming packets to the processing engines and their corresponding packet buffers.

WORKING EXAMPLE

In an embodiment of this invention, a DRAM controller can provide 16 threads access such that within 44 cycles (or 440 ns for a 100 MHz logic), 16 threads can access 512 bits each in a time multiplexed manner. In this embodiment, memory access is the only bottleneck and processing can be done within this time.

In the preferred embodiment of the invention, we have a total of 28 threads, including the 16 threads mentioned above. We assume that not all characters require DRAM accesses and some can be satisfied simply through BRAM accesses. That is, 16 threads can access the DRAM, while the 12 remaining threads work by accessing the BRAM. Assuming the packet data processing for such bytes takes 4 clock cycles to determine the next state, within 44 cycles, these 28 threads can process 148 bytes.

This in turn means 3.36 bytes/cycle, which is higher than 2.5 bytes/cycle required for the full-duplex Gbps line-rate operation. According to the invention, the ratio of bytes that require DRAM access to bytes that require BRAM access is around 12%. As discussed above, the Snort's rule-set data with all rules enabled has a density of 9%. Therefore, this embodiment shows that the invention can operate very well for line-rate string matching requirements of typical intrusion prevention systems implementing the Snort's rules.

In the worst case, occasionally, if the data is such that it requires DRAM access for every byte, the rate can be calculated separately. In such a case, 8 threads can access DRAM continuously every 440 ns and read 2 DRAM bursts each. During this time, 16 data bytes can be processed. This leads to an input data rate of 290 Mbps. Thus, instantaneous worst case processing rate of a system implementing the present invention will be 290 Mbps. On average, due to data characteristics, internal buffers, and multiple engines working in parallel, a system implementing the present invention can process 2 Gbps data at line-rate.

Table 1 below summarizes the above scenarios with typical data and rule-sets of Snort. From Table 1, it is evident that a system implementing the layered memory architecture discussed herein can indeed achieve a full-duplex Gigabit line rate well above 2 Gbps.

TABLE 1

| | |
|---|---|
| Threads requiring DRAM Access | 16 |
| Threads requiring BRAM Access | 12 |
| Cycles required for processing DRAM based entries | 44 |
| Cycles required for processing BRAM based entries | 4 |
| Total Bytes Processed in 44 cycles | 148 |
| Bytes processed/Cycle | 3.36 |
| Bytes that required DRAM access in 44 cycles | 16 |
| Bytes that required BRAM access in 44 cycles | 132 |
| Ratio of DRAM bytes/BRAM Bytes | 12% |
| Bytes processed in 10 ns | 3.36 |
| Bytes processed in 1 us | 336 |
| Bytes processed in 1 s | 336 MB |
| Bits processed | 2.688 Gbps |
| Instantaneous worst-case data rate (16 bytes/44 ns) | 290 Mbps |

Although the present invention and its advantages have been described in detail, it should be understood that the present invention is not limited to or defined by what is shown or discussed herein. For example, any digital computer systems can be configured or otherwise programmed to implement the methods and apparatuses disclosed herein. To the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. For example, the methodology and the layered memory architecture for DFA based string matching disclosed herein can be implemented for many practical applications in various fields such as bioinformatics. Therefore, the scope of the present invention should be determined by the following claims and their legal equivalents.

I claim:

1. An apparatus implementing a layered memory architecture and capable of string matching using deterministic finite automata, said apparatus comprising:

a memory necessary for said string matching, wherein said memory comprises at least three memories including a first memory means, a second memory means, and a third memory means, wherein said first memory means is faster and smaller than said second memory means and said second memory means is faster and smaller than said third memory means;

a partitioning mechanism for strategically partitioning said memory between said first, second, and third memory means, wherein said partitioning mechanism implements a data structure that organizes, associates, and stores data;

a host interface enabling an external host to set necessary data structures in said memory through host commands; and a caching mechanism for caching data locally from said third memory means to said second memory means based on need;

wherein said data structures include state transition tables, and output tables for said string matching;

wherein said external host populates said necessary data structures in said first, second, and third memory means in a manner that enables next state and output determinations at line-rate;

wherein said data structures comprise:

a first data structure consisting of state-wise character-set-wise bitmaps stored in said third memory means and cached to said second memory means for fast access;

a second data structure consisting of state-wise character-set-wise bitmaps and outputs for next state stored in said third memory means and fetched to a processing engine when required;

a third data structure implementing a hash based indexing mechanism for storage of outputs stored in said second memory means and fetched to a processing engine when required; and a fourth data structure for cache management of set-wise rules based on the least recently used (LRU) scheme.

2. The apparatus as set forth in claim 1, wherein said first memory means is a block random access memory (BRAM), said second memory means is a static RAM (SRAM), and said third memory means is a dynamic RAM (DRAM).

3. The apparatus as set forth in claim 1, further comprising:

a plurality of processing engines having access to said first, second, and third memory means for processing incoming packets; and a plurality of packet buffers, each corresponding to a processing engine, wherein said processing engines operate on multiple packet buffers simultaneously.

4. The apparatus as set forth in claim 3, wherein said processing engines process said packets independently and output results of said string matching and a packet ID.

5. The apparatus as set forth in claim 3, further comprising:

a mechanism to input packets character by character within said processing engines;

a mechanism to input rule-set corresponding to each packet at packet boundary; and a mechanism to associate a packet ID with each packet at said packet boundary; and a mechanism to read back a packet's matching output IDs along with a packet ID associated therewith.

6. The apparatus as set forth in claim 3, further comprising:

a load balancing arbiter for optimally assigning said incoming packets to said processing engines and their corresponding packet buffers, distributing load and memory bandwidth evenly across all processing engines.

7. The apparatus as set forth in claim 1, wherein said fourth data structure enables caching set-wise-character-wise bitmaps for a rule-set when required such that least recently used memory blocks in said memory continue to be freed until a suitable space is available to cache required memory blocks of said set-wise-character-wise bitmaps locally in said first memory means.

8. The apparatus as set forth in claim 1, wherein said caching mechanism accesses said third memory means, fetches next state and output bitmaps from said third memory means, and calculates the next state in cases where a state-wise character-set-wise bitmap specifies transition to a non-idle state.

9. The apparatus as set forth in claim 1, further comprising:

a mechanism to determine the next state for a packet, given the input character and current state, and to output, when applicable, said next state using a data structure specified in said packet.

10. The apparatus as set forth in claim 9, wherein said mechanism consults a state-wise-character-set-wise bitmap cached in said first memory means to determine whether said next-state leads to an idle state or to a valid state.

11. The apparatus as set forth in claim 1, wherein said apparatus is capable of operating said string matching at a line rate higher than 2 Gbps.

12. A network intrusion detection and prevention system implementing the apparatus as set forth in claim 1, wherein said first memory means is a block random access memory (BRAM), said second memory means is a static RAM (SRAM), and said third memory means is a dynamic RAM (DRAM), and wherein said apparatus further comprises:

a plurality of processing engines having access to said BRAM, SRAM, and DRAM;

a plurality of packet buffers, each corresponding to a processing engine, said processing engines operating on multiple packet buffers simultaneously;

a load balancing arbiter for optimally assigning incoming packets to said processing engines and their corresponding packet buffers, distributing load and memory bandwidth evenly across all processing engines;

a host interface enabling an external host to set necessary data structures in said BRAM, SRAM, and DRAM through host commands;

a caching mechanism for caching data locally from said DRAM to said SRAM based on need; and a state analyzing mechanism to determine the next state for a packet, given the input character and current state, and to output, when applicable, said next state using a data structure specified in said packet.

13. The system according to claim 12, wherein said data structures comprise:

a first data structure consisting of state-wise character-set-wise bitmaps stored in said third memory means and cached to said second memory means for fast access;

a second data structure consisting of state-wise character-set-wise bitmaps and outputs for next state stored in said third memory means and fetched to a processing engine when required;

a third data structure implementing a hash based indexing mechanism for storage of outputs stored in said second memory means and fetched to a processing engine when required; and a fourth data structure for cache management of set-wise rules based on the least recently used (LRU) scheme.

14. The system according to claim 12, wherein said state analyzing mechanism consults a state-wise-character-set-wise bitmap cached in said BRAM to determine whether said next-state leads to an idle state or to a valid state.

15. A method of achieving a fast data processing line rate for deterministic finite automata based string matching in a network intrusion detection and prevention system, said method comprising the steps of:

determining data structures necessary to organize, associate, and store data involved in said string matching;

configuring at least three memories having various speeds and capacities, including a block random access memory (BRAM), a static RAM (SRAM), and a dynamic RAM (DRAM);

strategically partitioning said data structures between said memories by:

caching the most frequently used data in said BRAM;

freeing cached data blocks from said BRAM when necessary, utilizing the least recently used (LRU) scheme;

placing data blocks that are large enough to fit in said SRAM;

storing bulk data that are read as a burst in said DRAM; and arranging multiple threads to work on multiple packets simultaneously to achieve said line rate while keeping latency to within allowable limits; and enabling an external host to set said data structures in said memories through host commands;

wherein said data structures include state transition tables, and output tables for said string matching;

wherein said enabling populates said necessary data structures in said three memories in a manner that enables next state and output determinations at line-rate;

wherein said data structures comprise:

a first data structure comprising state-wise character-set-wise bitmaps stored in said DRAM and cached to said BRAM for fast access;

a second data structure comprising state-wise character-set-wise bitmaps and outputs for next state stored in said DRAM and fetched to a processing engine when required;

a third data structure implementing a hash based indexing mechanism for storage of outputs stored in said BRAM and fetched to a processing engine when required; and a fourth data structure for cache management of set-wise rules based on the least recently used (LRU) scheme.

16. A tangible computer readable storage medium tangibly embodying a computer-executable program of instructions implementing-a layered memory architecture capable of string matching using deterministic finite automata, wherein the instructions implement a method comprising:
  string matching using a memory comprising at least three memories including a first memory, a second memory, and a third memory, wherein said first memory is faster and smaller than said second memory and said second memory is faster and smaller than said third memory;
  partitioning said memory between said first memory, second memory, and third memory. wherein said partitioning implements a data structure that organizes, associates, and stores data;
  enabling an external host to set necessary data structures in said memory through host commands; and
  caching data locally from said third memory to said second memory based on need;
  wherein said data structures include state transition tables, and output tables for said string matching;
  wherein said enabling populates said necessary data structures in said first memory, second memory, and third memory in a manner that enables next state and output determinations at line-rate;
  wherein said data structures comprise:
    a first data structure comprising state-wise character-set-wise bitmaps stored in said third memory and cached to said second memory for fast access;
    a second data structure comprising state-wise character-set-wise bitmaps and outputs for next state stored in said third memory and fetched to a processing engine when required;
    a third data structure implementing a hash based indexing mechanism for storage of outputs stored in said second memory and fetched to a processing engine when required; and
    a fourth data structure for cache management of set-wise rules based on the least recently used (LRU) scheme.

17. A digital computer system programmed to perform a method to implement a layered memory architecture capable of string matching using deterministic finite automata, the method comprising:
  string matching using a memory comprising at least three memories including a first memory, a second memory, and a third memory, wherein said first memory is faster and smaller than said second memory and said second memory is faster and smaller than said third memory;
  partitioning said memory between said first memory, second memory, and third memory, wherein said partitioning implements a data structure that organizes, associates, and stores data;
  enabling an external host to set necessary data structures in said memory through host commands; and
  caching data locally from said third memory to said second memory based on need;
  wherein said data structures include state transition tables, and output tables for said string matching;
  wherein said enabling populates said necessary data structures in said first memory, second memory, and third memory in a manner that enables next state and output determinations at line-rate;
  wherein said data structures comprise:
    a first data structure comprising state-wise character-set-wise bitmaps stored in said third memory and cached to said second memory for fast access;
    a second data structure comprising state-wise character-set-wise bitmaps and outputs for next state stored in said third memory and fetched to a processing engine when required;
    a third data structure implementing a hash based indexing mechanism for storage of outputs stored in said second memory and fetched to a processing engine when required; and
    a fourth data structure for cache management of set-wise rules based on the least recently used (LRU) scheme.

* * * * *